(12) United States Patent
Zhang

(10) Patent No.: US 12,444,191 B2
(45) Date of Patent: Oct. 14, 2025

(54) BACKGROUND AUDIO CONSTRUCTION

(71) Applicant: Shanghai Hode Information Technology Co., Ltd., Shanghai (CN)

(72) Inventor: Yi Zhang, Shanghai (CN)

(73) Assignee: Shanghai Hode Information Technology Co., Ltd., Shanghai (CN)

( * ) Notice: Subject to any disclaimer, the term of this patent is extended or adjusted under 35 U.S.C. 154(b) by 338 days.

(21) Appl. No.: 18/133,641

(22) Filed: Apr. 12, 2023

(65) Prior Publication Data

US 2023/0245451 A1 Aug. 3, 2023

Related U.S. Application Data

(63) Continuation of application No. PCT/CN2021/120377, filed on Sep. 24, 2021.

(30) Foreign Application Priority Data

Dec. 10, 2020 (CN) .......................... 202011437857.1

(51) Int. Cl.
*G06V 20/40* (2022.01)
*G06F 16/783* (2019.01)

(52) U.S. Cl.
CPC .......... *G06V 20/41* (2022.01); *G06F 16/7834* (2019.01); *G06V 20/46* (2022.01)

(58) Field of Classification Search
CPC ............................... G06V 20/41; G06V 20/46
See application file for complete search history.

(56) References Cited

U.S. PATENT DOCUMENTS

| 10,455,297 | B1 * | 10/2019 | Mahyar | .............. H04N 21/4532 |
| 11,450,104 | B1 * | 9/2022 | Mittal | ..................... G06V 40/10 |
| 2010/0265210 | A1 | 10/2010 | Nakanishi et al. | |
| 2013/0089303 | A1 | 4/2013 | Jiang et al. | |

(Continued)

FOREIGN PATENT DOCUMENTS

| CN | 101477798 A | 7/2009 |
| CN | 101976258 A | 2/2011 |

(Continued)

OTHER PUBLICATIONS

International Search Report with a mailing date of Nov. 11, 2021, in International application No. PCT/CN2021/120377, filed on Sep. 24, 2021 (4 pages).

(Continued)

*Primary Examiner* — Mishawn N. Hunter
(74) *Attorney, Agent, or Firm* — MCANDREWS HELD & MALLOY, LTD

(57) ABSTRACT

A background audio construction method is provided. The background audio construction method includes: performing semantic segmentation on to-be-processed video data to generate a corresponding semantic segmentation map, and extracting a semantic segmentation feature of the to-be-processed video data based on the semantic segmentation map; extracting an audio feature of each audio file in a pre-established audio set; and aligning the audio feature and the semantic segmentation feature, selecting a target audio file from the audio set based on an alignment result, and constructing background audio for the to-be-processed video data based on the target audio file.

18 Claims, 8 Drawing Sheets

(56) References Cited

U.S. PATENT DOCUMENTS

| | | | |
|---|---|---|---|
| 2018/0204597 A1* | 7/2018 | Rav-Acha | H04N 21/23439 |
| 2019/0043203 A1* | 2/2019 | Fleishman | G06F 18/29 |
| 2021/0099756 A1* | 4/2021 | Gnanapragasam | G06V 20/41 |
| 2021/0117685 A1* | 4/2021 | Sureshkumar | H04N 21/44016 |

FOREIGN PATENT DOCUMENTS

| | | |
|---|---|---|
| CN | 109862421 A | 6/2019 |
| CN | 110839173 A | 2/2020 |
| CN | 110971969 A | 4/2020 |
| CN | 111164601 A | 5/2020 |
| CN | 111324773 A | 6/2020 |
| CN | 111552777 A | 8/2020 |
| CN | 112584062 A | 3/2021 |
| JP | 2009296297 A | 12/2009 |

OTHER PUBLICATIONS

He, Hanwu; Wu, Yueming; Chen, Heen, "Augmented Reality Interactive Method and Implementation," Dec. 31, 2018 (7 pages).

* cited by examiner

BACKGROUND AUDIO CONSTRUCTION

CROSS-REFERENCE TO RELATED APPLICATIONS

This application is a continuation under 35 U.S.C. 111(a) of PCT International Application No. PCT/CN2021/120377, filed on Sep. 24, 2021, which claims priority to Chinese Patent Application No. 202011437857.1, filed on Dec. 10, 2020, the entire contents of which are hereby incorporated by reference in their entirety for all purposes.

TECHNICAL FIELD

This application relates to computer technologies, and in particular, to a background audio construction.

BACKGROUND

With development of information technology, especially rapid development of the Internet, online videos account for an increasingly high proportion. To make the video more attractive, background music that matches a theme of the video is usually added to the video. Good background music can enhance interest of a user in the video, and therefore view counts of the video can be increased.

In the technology of adding background music to a video, for content information of a video to which background music needs to be added, for example, a theme of the video, a background music library may be searched for background music that matches the video, and the background music may be used as the background music of the video.

SUMMARY

According to some embodiments of this application, a background audio construction method is provided, and includes:
  performing semantic segmentation on to-be-processed video data to generate a corresponding semantic segmentation map, and extracting a semantic segmentation feature of the to-be-processed video data based on the semantic segmentation map;
  extracting an audio feature of each audio file in a pre-established audio set; and
  aligning the audio feature and the semantic segmentation feature, selecting a target audio file from the audio set based on an alignment result, and constructing background audio for the to-be-processed video data based on the target audio file.

According to some embodiments of this application, a computing device is provided, and includes:
  a memory and a processor, wherein
  the memory is configured to store computer-executable instructions, the processor is configured to execute the computer-executable instructions, and when executing the computer-executable instructions, the processor perform operations including:
  performing semantic segmentation on to-be-processed video data to generate a corresponding semantic segmentation map, and extracting a semantic segmentation feature of the to-be-processed video data based on the semantic segmentation map;
  extracting an audio feature of each audio file in a pre-established audio set; and
  aligning the audio feature and the semantic segmentation feature, selecting a target audio file from the audio set based on an alignment result, and constructing background audio for the to-be-processed video data based on the target audio file.

According to some embodiments of this application, a non-transitory computer-readable storage medium is provided. The non-transitory computer-readable storage medium stores computer-executable instructions, which when executed by a processor, cause the processor to perform operations including:
  performing semantic segmentation on to-be-processed video data to generate a corresponding semantic segmentation map, and extracting a semantic segmentation feature of the to-be-processed video data based on the semantic segmentation map;
  extracting an audio feature of each audio file in a pre-established audio set; and
  aligning the audio feature and the semantic segmentation feature, selecting a target audio file from the audio set based on an alignment result, and constructing background audio for the to-be-processed video data based on the target audio file.

DETAILED DESCRIPTION

Figure 1:
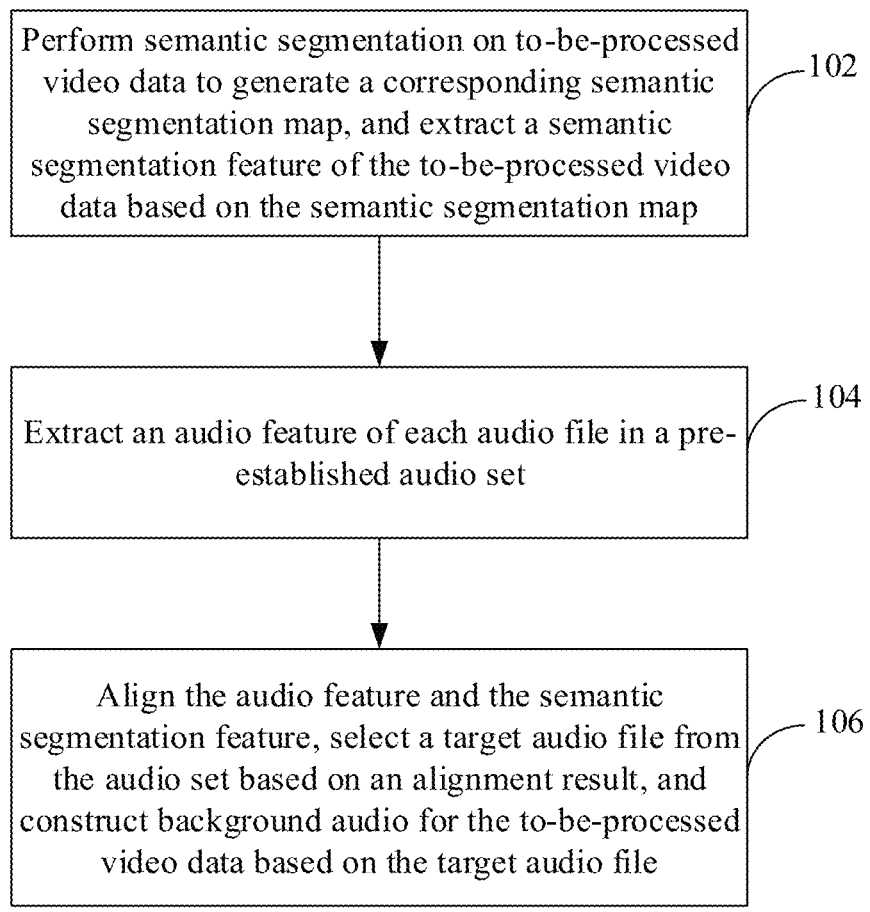
FIG. 1 is a flowchart of a background audio construction method according to an embodiment of this application.

Many specific details are described in the following descriptions to facilitate full understanding of this application. However, this application can be implemented in many different manners from those described herein. A person skilled in the art may make similar promotion without departing from the connotation of this application. Therefore, this application is not limited to the specific implementations disclosed below.

Terms used in one or more embodiments of this application are merely used to describe specific embodiments, but are not intended to limit the one or more embodiments of this application. The singular forms "a" and "the" used in one or more embodiments of this application and the appended claims are also intended to include plural forms, unless other meanings are clearly expressed in the context. It should be further understood that the term "and/or" used in one or more embodiments of this application indicates and includes any or all possible combinations of one or more associated listed items.

It should be understood that although terms such as "first" and "second" can be used in one or more embodiments of this application to describe various types of information, the information is not limited to these terms. These terms are used only to distinguish between a same type of information. For example, without departing from the scope of one or more embodiments of this application, "first" may also be referred to as "second", and similarly, "second" may also be referred to as "first". Depending on the context, the word "if" used herein may be interpreted as "when" or "in response to determining".

First, nouns related to one or more embodiments of this application are explained.

A semantic segmentation map is a grayscale map corresponding to an input original image, and each pixel in the semantic segmentation map is a category label of a corresponding pixel on the original image.

In a current related technology, the video and background music in the background music library are usually directly compared, to obtain background music that most matches the theme of the video. Consequently, there is relatively low efficiency of obtaining the background music, and there is a relatively weak correlation between the obtained background music and the video.

In view of this, embodiments of this application provide a background audio construction method, a computing device and a computer-readable storage medium, to resolve a technical disadvantage in the prior art that a relatively single video feature is extracted if a video classification method is directly used, resulting in a low correlation of a background music matching result, which are described one by one in detail in the following embodiments.

In the embodiments of this application, the background audio construction method is implemented. The background audio construction method includes: performing semantic segmentation on to-be-processed video data to generate a corresponding semantic segmentation map, and extracting a semantic segmentation feature of the to-be-processed video data based on the semantic segmentation map; extracting an audio feature of each audio file in a pre-established audio set; and aligning the audio feature and the semantic segmentation feature, selecting a target audio file from the audio set based on an alignment result, and constructing background audio for the to-be-processed video data based on the target audio file.

The background audio is constructed for the to-be-processed video data in the foregoing manner. In this way, efficiency of obtaining the background audio of the to-be-processed video data is improved, and a correlation between the obtained background audio of the to-be-processed video data and the to-be-processed video data is improved, so that there is higher background audio matching accuracy and a better video display effect.

FIG. 1 is a flowchart of a background audio construction method according to an embodiment of this application. The method includes the following steps.

Step 102: Perform semantic segmentation on to-be-processed video data to generate a corresponding semantic segmentation map, and extract a semantic segmentation feature of the to-be-processed video data based on the semantic segmentation map.

The background audio construction method in this embodiment of this application may be applied to various scenarios in which background audio (background music) needs to be constructed. For example, when posting a video on a short video platform, a user may add background music to the video by using the background audio construction method provided in this embodiment of this application. Background music that is highly correlated with the video can be obtained more quickly by using the background audio construction method. Alternatively, when background music needs to be added to a live or recorded video or live or recorded audio, background music that is highly correlated with the video or the audio may still be quickly obtained by using the background audio construction method.

In some embodiments, semantic segmentation is classification at a pixel level, and pixels belonging to a same category in an image or a video frame are grouped into one category. Therefore, after semantic segmentation is performed on the to-be-processed video data to generate the corresponding semantic segmentation map, the semantic segmentation feature of the to-be-processed video data may be extracted based on the semantic segmentation map.

During specific implementation, the to-be-processed video data in this embodiment of this application includes to-be-processed video data and to-be-processed audio data, and the to-be-processed video data may be presented on a client such as a large video data play device, a game machine, a desktop computer, a smartphone, a tablet computer, an MP3 (Moving Picture Experts Group Audio Layer III, moving picture experts group audio layer III) player, an MP4 (Moving Picture Experts Group Audio Layer IV, moving picture experts group audio layer IV) player, a laptop portable computer, an electronic book reader, and another display terminal.

In actual application, the semantic segmentation feature includes but is not limited to category label distribution statistics, edge pixel percentage statistics, difference statistics about semantic segmentation maps of adjacent key frames, and the like. The category label distribution statistics are a percentage of a quantity of pixels corresponding to each category label. If pixels above, below, on a left side, and on a right side of a pixel are defined as adjacent pixels of the pixel, when there is a pixel whose category label is different from that of the pixel in the adjacent pixels of the pixel, the pixel is an edge pixel, and the edge pixel percentage statistics are statistics about a percentage of edge pixels in a total quantity of pixels corresponding to each category label of the pixel, namely, an edge pixel percentage. The difference statistics about the semantic segmentation maps of the key frames are difference statistics about category labels of pixels at a same position in semantic segmentation maps corresponding to adjacent video segment key frames. If the category labels of the pixels at the same position are the same in the adjacent frames, a difference at the position is 0. Otherwise, the difference is 1.

After the semantic segmentation feature is extracted, background music may be constructed for the to-be-processed video data based on the semantic segmentation feature and an audio feature of each audio file in an audio set.

Figure 2:
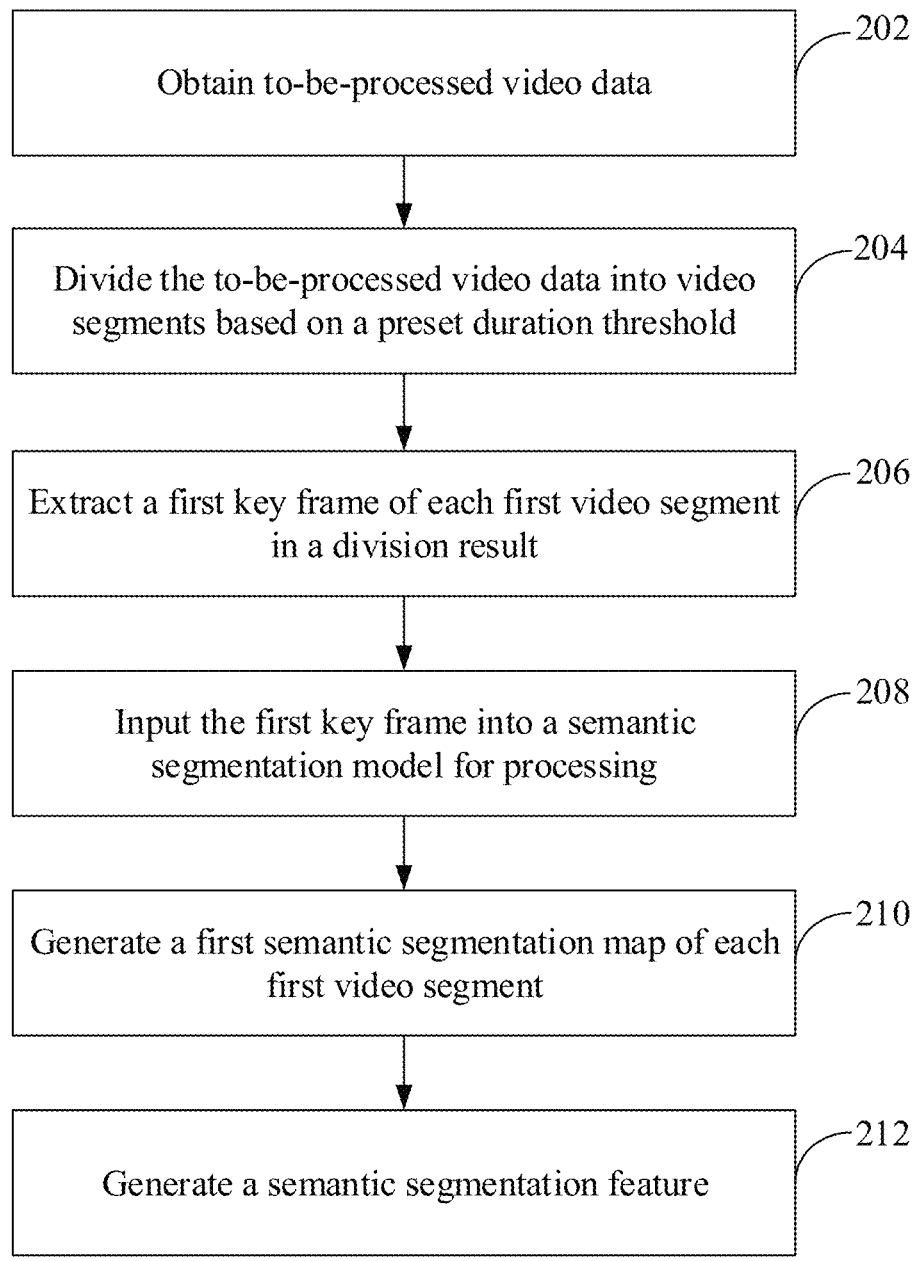
FIG. 2 is a schematic diagram of a process of generating a semantic segmentation map according to an embodiment of this application.

During specific implementation, FIG. 2 is a schematic diagram of a process of generating a semantic segmentation map according to an embodiment of this application. The process includes steps 202 to 210.

Step 202: Obtain the to-be-processed video data.

Step 204: Divide the to-be-processed video data into video segments based on a preset duration threshold.

Step 206: Extract a first key frame of each first video segment in a division result.

Step 208: Input the first key frame into a semantic segmentation model for processing.

Step 210: Generate a first semantic segmentation map of each first video segment.

Step 212: Generate the semantic segmentation feature.

Further, in some embodiments, the extracting a semantic segmentation feature of the to-be-processed video data based on the semantic segmentation map may be implemented in the following manner:

extracting a first semantic segmentation feature of each first video segment based on the first semantic segmentation map; and calculating an average value of first semantic segmentation features of all the first video segments in the division result, and using the average value as the semantic segmentation feature of the to-be-processed video data.

In some embodiments, in this embodiment of this application, the semantic segmentation map corresponding to the to-be-processed video data may be generated by using the semantic segmentation model. Before the to-be-processed video data is input into the semantic segmentation model, the to-be-processed video data may be first divided into video segments based on the preset duration threshold, the key frame of each video segment in the division result may be extracted, and then the key frame is input into the semantic segmentation model, so that the semantic segmentation model performs semantic segmentation on the key frame, to generate the semantic segmentation map of the key frame.

If the to-be-processed video data is divided into n video segments, the key frame may be any one or more of a random frame, a start frame, an end frame, or an intermediate frame of each of the n video segments.

In addition, as described above, the semantic segmentation feature includes but is not limited to the category label distribution statistics, the edge pixel percentage statistics, the difference statistics about the semantic segmentation maps of the adjacent key frames, and the like. Therefore, after the key frame of each of the n video segments is determined and the semantic segmentation map of each key frame is generated by using the semantic segmentation model, semantic segmentation features such as category label distribution statistics, edge pixel percentage statistics, and difference statistics about semantic segmentation maps of adjacent key frames of each key frame may be extracted based on each semantic segmentation map, average values of category label distribution statistics, edge pixel percentage statistics, and difference statistics about semantic segmentation maps of adjacent key frames of all the key frames may be separately calculated, and average value calculation results may be used as semantic segmentation features of the to-be-processed video data, to construct the background music for the to-be-processed video data based on the semantic segmentation feature of the to-be-processed video data and the audio feature of each audio file in the audio set.

The semantic segmentation map of the to-be-processed video data is extracted, and the semantic segmentation feature of the to-be-processed video data is extracted based on the semantic segmentation map, to diversify extracted video features of the to-be-processed video data, so as to ensure a correlation of background audio, of the to-be-processed video data, constructed based on the video features.

Further, the semantic segmentation model is trained in the following manner:

dividing a sample video file into video segments based on the preset duration threshold;

extracting a second key frame of each second video segment in a division result; and using the second key frame as sample data, using a category identifier of each pixel in a semantic segmentation map of the second key frame as a label, and inputting them to a to-be-trained semantic segmentation model for training, to obtain the semantic segmentation model, where the semantic segmentation model associates the second key frame with the category identifier of each pixel.

In some embodiments, after the sample video file is obtained, the sample video file may be divided into video segments based on fixed duration, the key frame (the second key frame) of each video segment (the second video segment) in the division result may be extracted, and the semantic segmentation map of the key frame may be extracted, so that the key frame is used as the sample data, and the category identifier of each pixel in the semantic segmentation map of the key frame is used as a label, to train the to-be-trained semantic segmentation model. The semantic segmentation model obtained through training associates the key frame with the category identifier of each pixel in the semantic segmentation map. In a model application process, the key frame (a video frame) is input into the semantic segmentation model to output the semantic segmentation map of the key frame.

In a model training process, a category of each pixel in the semantic segmentation map is determined based on an object included in the key frame. For example, if the key frame is a landscape, the key frame may include an object such as sky, grass, a road, or a building, and the category of each pixel in the key frame may be sky, grass, a road, or a building. In actual application, different categories may be represented by different colors or different numbers. For example, a pixel in which the sky is located is represented by light blue, and a pixel in which the road is located is represented by gray, or a pixel in which the sky is located is represented by a number 1, and a pixel in which the road is located is represented by a number 2.

In actual application, the semantic segmentation model is a multi-layer convolutional network, and includes two parts: downsampling and upsampling. In a training process of the semantic segmentation model, the second key frame is used as the sample data, and the category identifier of each pixel in the semantic segmentation map of the second key frame is used as a label.

Therefore, after the second key frame and the category identifier of each pixel in the semantic segmentation map of the second key frame are input into the to-be-trained semantic segmentation model, the semantic segmentation model performs downsampling processing on the second key frame to scale the second key frame, and then performs upsampling processing on the key frame obtained after scaling processing to enlarge the scaled key frame, processes the enlarged key frame to output a predicted category identifier of each pixel in the semantic segmentation map of the second key frame, and calculates an error between the predicted category identifier of each pixel and the (real) category identifier of each pixel in the semantic segmentation map of the second key frame in the label, to adjust a parameter of the semantic segmentation model based on the error. The parameter of the semantic segmentation model is adjusted in the foregoing manner, to obtain the trained semantic segmentation model. This helps ensure accuracy of a result output by the semantic segmentation model.

Step 104: Extract an audio feature of each audio file in a pre-established audio set.

In some embodiments, the audio set is a soundtrack library. In this embodiment of this application, the background music is constructed for the to-be-processed video data by using the audio file included in the soundtrack library. After the semantic segmentation feature of the to-be-processed video data is extracted, the audio feature of each audio file in the soundtrack library may be extracted, to construct the background music for the to-be-processed video data based on the semantic segmentation feature and the audio feature of each audio file in the audio set.

Figure 3:
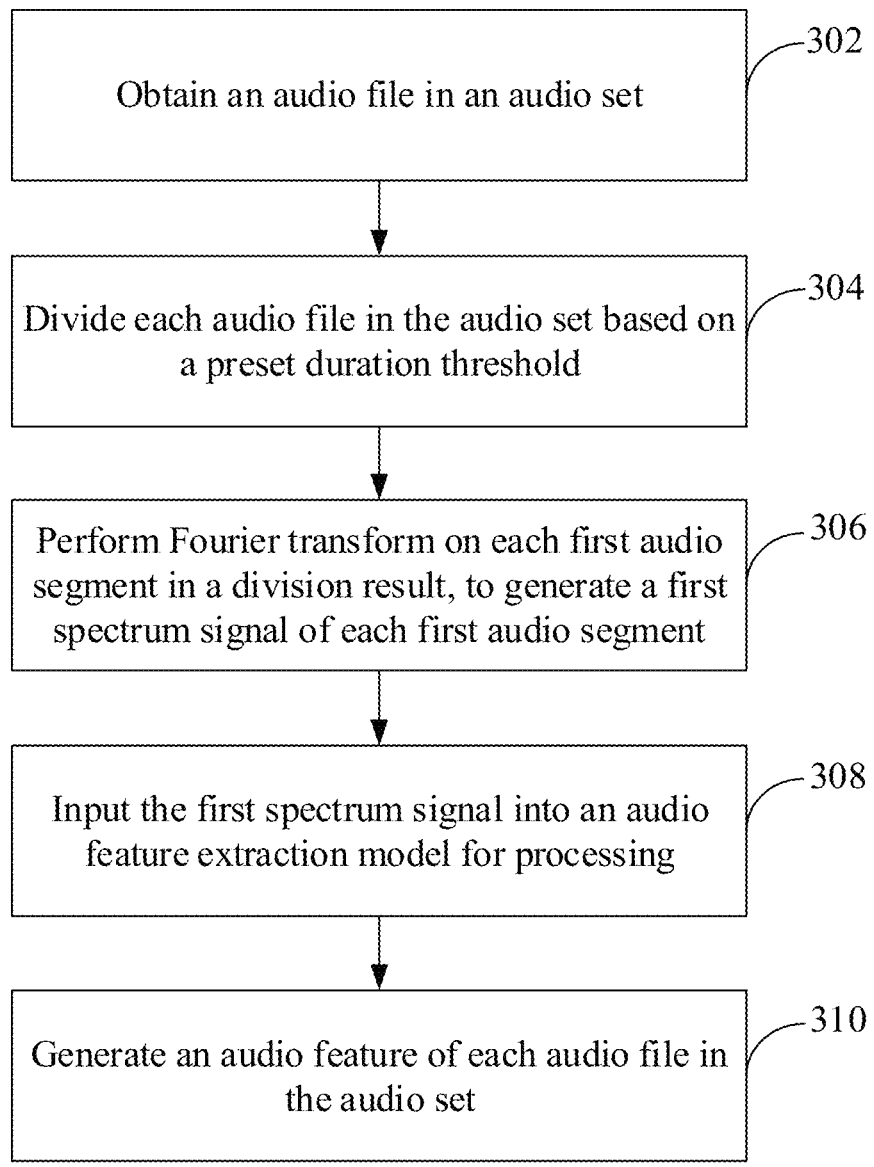
FIG. 3 is a schematic diagram of an audio feature extraction process according to an embodiment of this application.

During specific implementation, FIG. 3 is a schematic diagram of an audio feature extraction process according to an embodiment of this application. The process includes steps 302 to 310.

Step 302: Obtain the audio file in the audio set.

Step 304: Divide each audio file in the audio set based on the preset duration threshold.

Step 306: Perform Fourier transform on each first audio segment in a division result, to generate a first spectrum signal of each first audio segment.

Step 308: Input the first spectrum signal into an audio feature extraction model for processing.

Step 310: Generate the audio feature of each audio file in the audio set.

In some embodiments, in this embodiment of this application, the audio feature of each audio file in the soundtrack library may be extracted by using the audio feature extraction model. Before each audio file is input into the audio feature extraction model, each audio file may be first divided based on the preset duration threshold. The preset duration threshold is consistent with the preset duration threshold corresponding to the case in which the to-be-processed video data is divided into video segments.

After the audio file is divided to obtain the division result, Fourier transform is performed on each audio segment in the division result to generate the spectrum signal of each audio segment, and then the spectrum signal is input into the audio feature extraction model to extract the audio feature of the audio segment by using the audio feature extraction model.

If the audio file in the soundtrack library is divided into m audio segments, spectrum signals of the m audio segments are input into the audio feature extraction model to generate m audio features.

In a process of constructing the background audio for the to-be-processed video data, each audio file in the audio set is divided, Fourier transform is performed on the audio segment in the division result, and the generated spectrum signal is used as an input to the audio feature extraction model, to help ensure accuracy of a result output by the audio feature extraction model.

Further, the audio feature extraction model is trained in the following manner:
dividing a sample audio file based on the preset duration threshold;
performing Fourier transform on each second audio segment in a division result, to generate a second spectrum signal of each second audio segment; and
using the second spectrum signal as sample data, using an audio type of the sample audio file as a label, and inputting them to a to-be-trained audio feature extraction model for training, to obtain the audio feature extraction model, where the audio feature extraction model associates the second spectrum signal with the audio type.

In some embodiments, after the sample audio file is obtained, the sample audio file may be divided into audio segments based on fixed duration. The fixed duration is consistent with the fixed duration (the preset duration threshold) corresponding to the case in which the sample video file is divided into video segments.

After the sample audio file is divided, Fourier transform is performed on each audio segment in the division result to generate the spectrum signal of each audio segment, the spectrum signal is used as the sample data, and the audio type of the sample audio file is used as a label for model training. In an application process of the audio feature extraction model obtained through training, the spectrum signal of the audio data is input into the audio feature extraction model to output the audio feature of the audio data.

In actual application, the audio feature extraction model is a convolutional neural network. In a process of training the to-be-trained audio feature extraction model, the second spectrum signal of the second audio segment may be used as the sample data, and the audio type of the sample audio file may be used as a label to train the convolutional neural network, and the convolutional neural network processes the second spectrum signal to output a predicted result of an audio type corresponding to the second spectrum signal.

A loss value between the predicted result and a label of the second spectrum signal is calculated, and a model parameter of the audio feature extraction model is iteratively updated based on the loss value and by using a back propagation algorithm of the convolutional neural network, to obtain the trained audio feature extraction model.

In the model training process, the sample audio file is divided, Fourier transform is performed on the audio segment in the division result, and the generated spectrum signal is used as an input to the audio feature extraction model, to help ensure accuracy of a result output by the audio feature extraction model.

Step 106: Align the audio feature and the semantic segmentation feature, select a target audio file from the audio set based on an alignment result, and construct background audio for the to-be-processed video data based on the target audio file.

In some embodiments, the aligning the audio feature and the semantic segmentation feature is performing forced alignment on the audio feature and the semantic segmentation feature, in other words, determining a time interval corresponding to the semantic segmentation feature in audio.

Forced alignment is a technology for obtaining a temporal correspondence between a given semantic segmentation feature and an audio feature, and may be implemented by using a forced alignment tool. For example, the semantic segmentation feature and the audio feature may be aligned by using kaldi (an open-source speech recognition tool (Toolkit) that implements a decoding algorithm by using WFST) or HTK (HMM Toolkit, an HMM model-based speech processing tool).

After the audio feature and the semantic segmentation feature are aligned, the background audio may be constructed for the to-be-processed video data based on the alignment result.

In some embodiments, during specific implementation, the audio feature and the semantic segmentation feature may be aligned in the following manner:
performing dimension scaling processing on the audio feature and the semantic segmentation feature based on a preset feature dimension, to generate a target audio feature and a target semantic segmentation feature; and
aligning the target audio feature and the target semantic segmentation feature.

In some embodiments, the semantic segmentation feature and the audio feature may differ in feature dimension. Therefore, to ensure accuracy of a background audio construction result, in this embodiment of this application, before the semantic segmentation feature and the audio feature are aligned, feature dimension scaling processing may be first performed on the semantic segmentation feature and the audio feature. In some embodiments, feature dimensions of the semantic segmentation feature and the audio feature are uniformed, the semantic segmentation feature and the audio feature are scaled to a same dimension to obtain the scaled target audio feature and target semantic segmentation feature, and then the target semantic segmentation feature and the target audio feature are aligned.

In actual application, a fully connected layer may be added before an output layer of each of the audio feature extraction model and the semantic segmentation model. If an m1-dimensional audio feature needs to be scaled to an n-dimensional feature, a fully connected layer newly added before an output layer of the audio feature extraction model may perform feature dimension scaling on the input m-dimensional feature, and output the n-dimensional feature. Similarly, if an m2-dimensional semantic segmentation feature needs to be scaled to an n-dimensional feature, a fully connected layer newly added before an output layer of the semantic segmentation model may perform feature dimension scaling on the input m2-dimensional feature, and output the n-dimensional feature.

In addition, in some embodiments, the aligning the audio feature and the semantic segmentation feature, selecting a target audio file from the audio set based on an alignment result, and constructing background audio for the to-be-processed video data based on the target audio file may be implemented in the following manner:

calculating a distance between the audio feature and the semantic segmentation feature; and using an audio file corresponding to an audio feature whose distance from the semantic segmentation feature is less than a preset distance threshold as the target audio file, and constructing the background audio based on the target audio file.

In some embodiments, after the semantic segmentation feature of the to-be-processed video data and the audio feature of the audio file are extracted, the audio feature and the semantic segmentation feature are aligned. In some embodiments, this may be implemented by calculating the distance between the audio feature and the semantic segmentation feature, and the audio file corresponding to the audio feature whose distance from the semantic segmentation feature is less than the preset distance threshold is used as the target audio file.

The audio feature of the audio file is extracted by using the audio feature extraction model, semantic segmentation features of the key frames in the to-be-processed video data are extracted by using the semantic segmentation model, the semantic segmentation features corresponding to the key frames are averaged in a time dimension, and then compared with the audio feature corresponding to the audio file in the audio set, distances between the semantic segmentation features and the audio feature are calculated and sorted, and the audio file corresponding to a distance that is less than the preset threshold is selected as the background audio.

In actual application, the distance between the audio feature and the semantic segmentation feature may include but is not limited to a Euclidean distance, a cosine distance, or the like.

In addition, in some embodiments, the constructing background audio based on the target audio file may be implemented in the following manner: A target audio segment is determined based on distances between different audio segments in the target audio file and different video segments in the to-be-processed video data, and the background audio is constructed for the to-be-processed video data based on a correspondence between the target audio segment and the video segment in the to-be-processed video data.

For example, when the distance is a Euclidean distance, if the determined target audio file is an audio file Y1 and an audio file Y2, and the video segment division result of the to-be-processed video data is a video segment V1, a video segment V2, and a video segment V3, and if it is determined that a Euclidean distance between an audio segment Y11 in the audio file Y1 and the video segment V3 is greater than the preset distance threshold (duration of the audio segment Y11 is equal to that of the video segment V3), a Euclidean distance between an audio segment Y15 in the audio file Y1 and the video segment V2 is greater than the preset distance threshold (duration of the audio segment Y15 is equal to that of the video segment V2), and a Euclidean distance between an audio segment Y23 in the audio file Y2 and the video segment V1 is greater than the preset distance threshold (duration of the audio segment Y23 is equal to that of the video segment V1), the background audio constructed for the to-be-processed video data based on the target audio file is the audio segment Y23→the audio segment Y15→the audio segment Y11.

In addition, the aligning the audio feature and the semantic segmentation feature is inputting the audio feature and the semantic segmentation feature into an audio alignment model for alignment.

Figure 4:
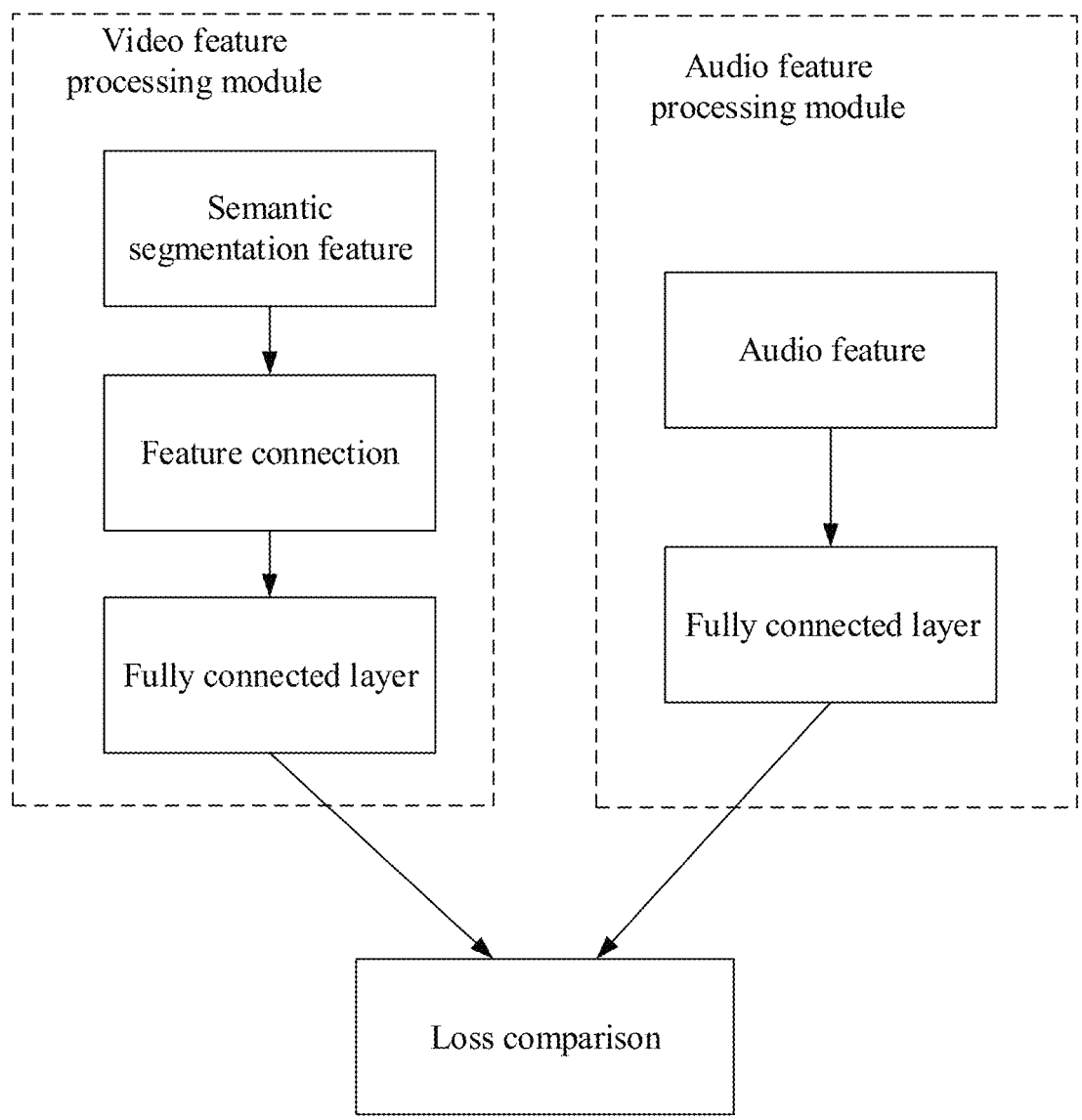
FIG. 4 is a schematic diagram of an alignment process according to an embodiment of this application.

FIG. 4 is a schematic diagram of an alignment process according to an embodiment of this application. The audio alignment model includes a video feature processing means and an audio feature processing means. After the audio feature and the semantic segmentation feature are input into the audio alignment model, the video feature processing means performs feature connection on the semantic segmentation feature, and inputs a connection result into a fully connected layer, and the audio feature processing means inputs the audio feature into the fully connected layer, to uniform the feature dimensions of the audio feature and the semantic segmentation feature. Finally, loss value calculation is performed for output results of the two means, to adjust a parameter of the audio alignment model by using a loss value calculation result.

Figure 5:
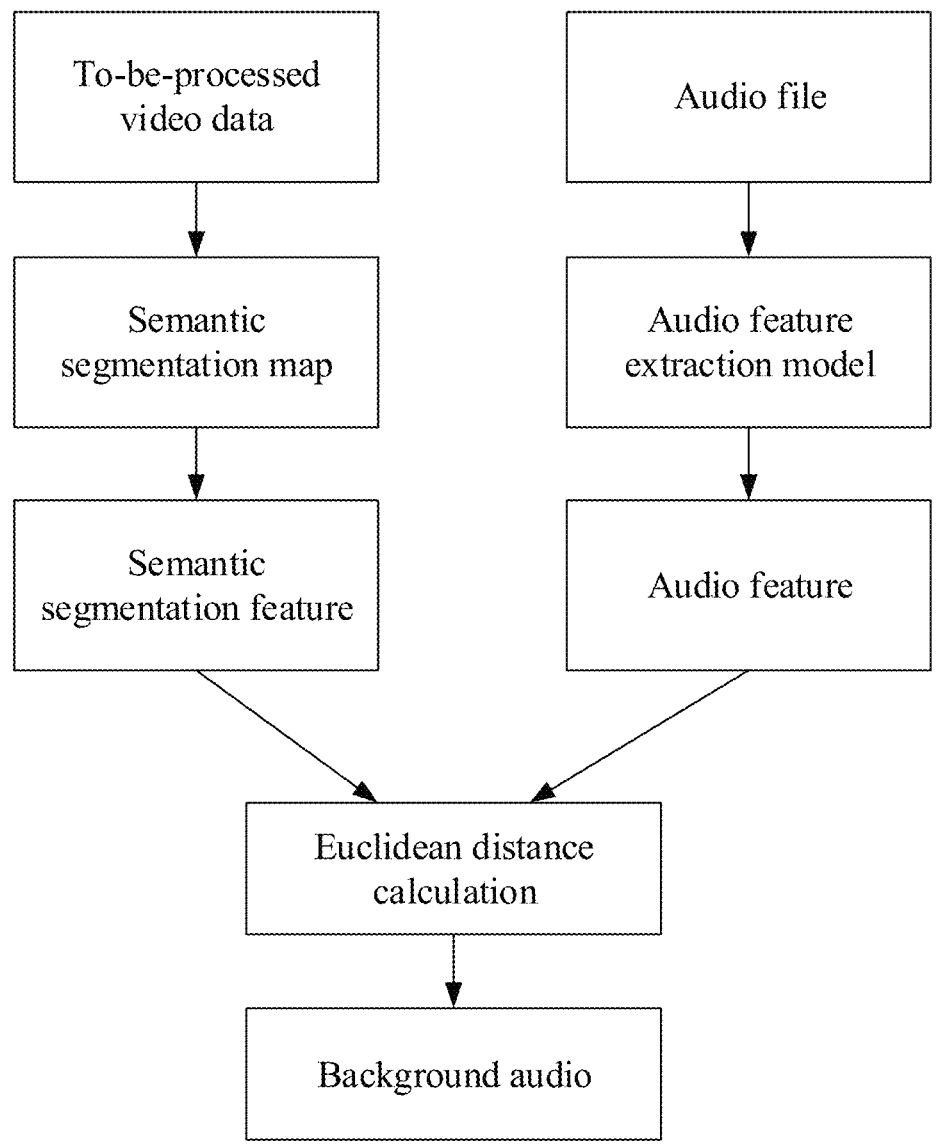
FIG. 5 is a schematic diagram of a background audio construction process according to an embodiment of this application.

FIG. 5 is a schematic diagram of a background audio construction process according to an embodiment of this application. After the to-be-processed video data is obtained, semantic segmentation is performed on the to-be-processed video data to generate the corresponding semantic segmentation map, and the semantic segmentation feature of the to-be-processed video data is extracted based on the semantic segmentation map. After the audio file is obtained, the audio file is input into the audio feature extraction model to generate the corresponding audio feature, then the Euclidean distance between the semantic segmentation feature and the audio feature is calculated, and the audio file corresponding to a distance that is less than the preset distance threshold in the calculation result is used as the background audio of the to-be-processed video data.

Further, the audio alignment model is trained in the following manner:

constructing a plurality of triplet training samples including sample video data, positive sample audio data, and negative sample audio data;
inputting the plurality of triplet training samples into the audio alignment model, to obtain feature vectors of sample video data, positive sample audio data, and negative sample audio data in each triplet training sample; and
calculating a first distance between the feature vectors of the sample video data and the positive sample audio data and a second distance between the feature vectors of the sample video data and the negative sample audio data in each triplet training sample, inputting the first distance and the second distance into a metric learning loss function, and training the audio alignment model based on an output of the loss function until the loss function tends to be stable.

In some embodiments, the sample video data is randomly selected video data, the positive sample audio data is audio data that successfully matches the sample video data, and the negative sample audio data is audio data that fails to match the sample video data. If 1000 pieces of sample video data are selected, $1000^3$ triplets may be constructed. All the triplets may be used for model training, or some triplets may be randomly selected for model training.

For example, a piece of video data is selected as the sample video data, audio data that successfully matches the sample video data is selected as the positive sample audio data, audio data that fails to match the sample video data is selected as the negative sample audio data, the sample video data is divided into video segments, the positive sample audio data and the negative sample audio data are divided into audio segments, Fourier transform is performed on an audio segment division result, and then a video segment division result and a Fourier transform result are input into a to-be-trained audio alignment model for training.

A distance between a semantic segmentation feature of the video data used as the sample video data and an audio feature of the positive sample audio data and a distance between the semantic segmentation feature of the video data used as the sample video data and an audio feature of the negative sample audio data are calculated, the two distances are input into the metric learning loss function, and the audio alignment model is trained based on an output of the loss function until the loss function tends to be stable.

In some embodiments, the triplet loss function may be as follows:

$$\sum_i^N \left[ \|f(x_i^a) - f(x_i^p)\|_2^2 - \|f(x_i^a) - f(x_i^n)\|_2^2 + \alpha \right]_+$$

Herein, i is a number of the triplet, N is a quantity of triplets, $x^a$ is the semantic segmentation feature of the sample video data, $x^p$ is the audio feature of the positive sample audio data, $x^n$ is the audio feature of the negative sample audio data, $\|f(x_i^a) - f(x_i^p)\|_2^2$ is a Euclidean distance between the semantic segmentation feature of the sample video data and the audio feature of the positive sample audio data, $\|f(x_i^a) - f(x_i^n)\|_2^2$ is a Euclidean distance between the semantic segmentation feature of the sample video data and the audio feature of the negative sample audio data, and $\alpha$ is a minimum interval between the Euclidean distance between the semantic segmentation feature of the sample video data and the audio feature of the negative sample audio data and the Euclidean distance between the semantic segmentation feature of the sample video data and the audio feature of the positive sample audio data. A specific parameter value of $\alpha$ may be determined based on model performance.

After the audio alignment model is iteratively calculated and the parameter of the audio alignment model is updated based on the loss function, a value of the loss function finally decreases from an initial larger value until the loss function tends to be stable. That the loss function tends to be stable means that the value of the loss function no longer decreases and is converged, for example, approximates to 0. The audio alignment model is trained to obtain the trained audio alignment model.

After the audio alignment model is trained by using the triplet loss function, it may be implemented, by using the feature vector output by the audio alignment model, that there is a short Euclidean distance between the semantic segmentation feature of the video data and the audio feature of the audio data that successfully matches the video data, and there is a long Euclidean distance between the semantic segmentation feature of the video data and the audio feature of the audio data that fails to match the video data.

In addition to calculating the loss value of the audio alignment model by calculating the Euclidean distance between the semantic segmentation feature of the sample video data and the audio feature of the negative sample audio data and the Euclidean distance between the semantic segmentation feature of the sample video data and the audio feature of the positive sample audio data, the loss value of the audio alignment model may be calculated by calculating a cosine distance between the semantic segmentation feature of the sample video data and the audio feature of the negative sample audio data and a cosine distance between the semantic segmentation feature of the sample video data and the audio feature of the positive sample audio data, to iteratively calculate the audio alignment model and update the parameter of the audio alignment model based on the loss value.

In actual application, in addition to calculating the loss value by calculating the Euclidean distance or the cosine distance, the loss value may be calculated by selecting another manner. A specific calculation manner may be determined based on an actual requirement. This is not limited herein.

In this embodiment of this application, semantic segmentation is performed on the to-be-processed video data to generate the corresponding semantic segmentation map, and the semantic segmentation feature of the to-be-processed video data is extracted based on the semantic segmentation map; the audio feature of each audio file in the pre-established audio set is extracted; and the audio feature and the semantic segmentation feature are aligned, the target audio file is selected from the audio set based on the alignment result, and the background audio is constructed for the to-be-processed video data based on the target audio file.

The background audio is constructed for the to-be-processed video data in the foregoing manner. In this way, efficiency of obtaining the background audio of the to-be-processed video data is improved, and a correlation between the obtained background audio of the to-be-processed video data and the to-be-processed video data is improved, so that there is higher background audio matching accuracy and a better video display effect.

Figure 6:
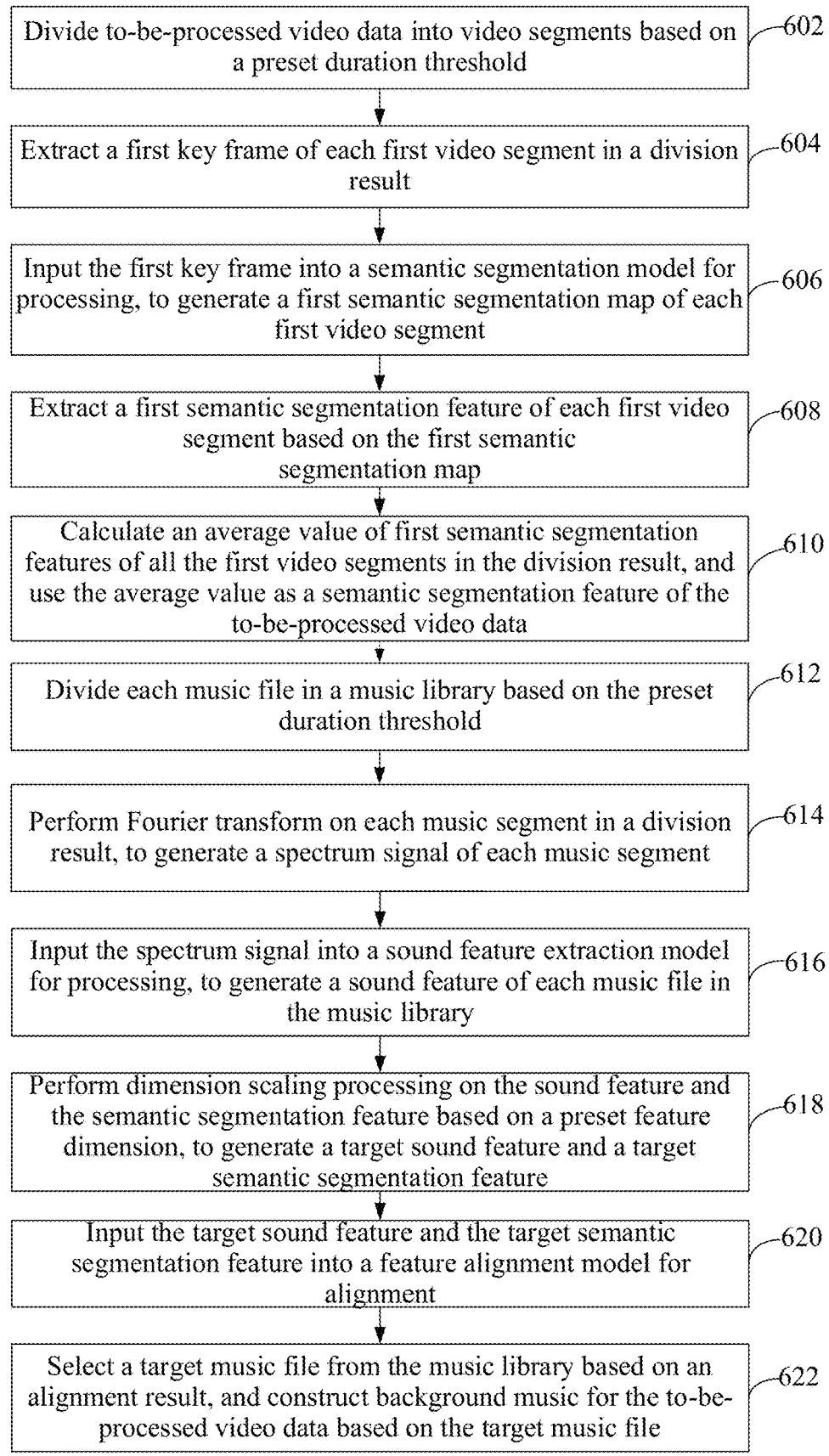
FIG. 6 is a flowchart of a processing procedure in which the background audio construction method is applied to a background music construction method in the video field according to an embodiment of this application.

Referring to FIG. 6, the background audio construction method provided in the embodiment of this application is further described by using an example in which the background audio construction method is applied to background music construction in the video field. FIG. 6 is a flowchart of a processing procedure of a background audio construction method applied to the video field according to an embodiment of this application. In some embodiments, the method includes the following steps.

Step 602: Divide to-be-processed video data into video segments based on a preset duration threshold.

Step 604: Extract a first key frame of each first video segment in a division result.

Step 606: Input the first key frame into a semantic segmentation model for processing, to generate a first semantic segmentation map of each first video segment.

Step 608: Extract a first semantic segmentation feature of each first video segment based on the first semantic segmentation map.

Step 610: Calculate an average value of first semantic segmentation features of all the first video segments in the division result, and use the average value as a semantic segmentation feature of the to-be-processed video data.

Step 612: Divide each music file in a music library based on the preset duration threshold.

Step 614: Perform Fourier transform on each music segment in a division result, to generate a spectrum signal of each music segment.

Step 616: Input the spectrum signal into a sound feature extraction model for processing, to generate a sound feature of each music file in the music library.

Step 618: Perform dimension scaling processing on the sound feature and the semantic segmentation feature based on a preset feature dimension, to generate a target sound feature and a target semantic segmentation feature.

Step 620: Input the target sound feature and the target semantic segmentation feature into a feature alignment model for alignment.

Step 622: Select a target music file from the music library based on an alignment result, and construct background music for the to-be-processed video data based on the target music file.

The background music is constructed for the to-be-processed video data in the foregoing manner. In this way, efficiency of obtaining the background music of the to-be-processed video data is improved, and a correlation between the obtained background music of the to-be-processed video data and the to-be-processed video data is improved, so that there is higher background music matching accuracy and a better video display effect.

Figure 7:
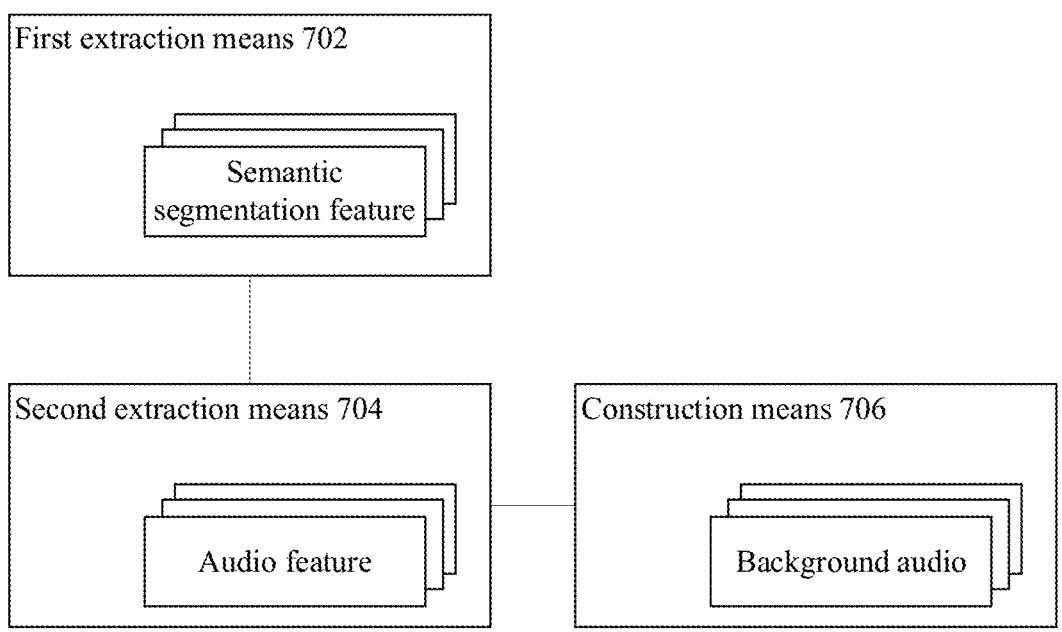
FIG. 7 is a schematic diagram of a structure of a background audio construction apparatus according to an embodiment of this application.

Corresponding to the foregoing method embodiment, this application further provides an embodiment of a background audio construction apparatus. FIG. 7 is a schematic diagram of a structure of a background audio construction apparatus according to an embodiment of this application. As shown in FIG. 7, the apparatus includes:

a first extraction means 702, configured to: perform semantic segmentation on to-be-processed video data to generate a corresponding semantic segmentation map, and extract a semantic segmentation feature of the to-be-processed video data based on the semantic segmentation map;

a second extraction means 704, configured to extract an audio feature of each audio file in a pre-established audio set; and a construction means 706, configured to: align the audio feature and the semantic segmentation feature, select a target audio file from the audio set based on an alignment result, and construct background audio for the to-be-processed video data based on the target audio file.

Optionally, the first extraction means 702 includes:

a first division sub-means, configured to divide the to-be-processed video data into video segments based on a preset duration threshold;

a first extraction sub-means, configured to extract a first key frame of each first video segment in a division result; and a first processing sub-means, configured to input the first key frame into a semantic segmentation model for processing, to generate a first semantic segmentation map of each first video segment.

Optionally, the first extraction means 702 further includes:

a second extraction sub-means, configured to extract a first semantic segmentation feature of each first video segment based on the first semantic segmentation map; and a first calculation sub-means, configured to: calculate an average value of first semantic segmentation features of all the first video segments in the division result, and use the average value as the semantic segmentation feature of the to-be-processed video data.

Optionally, the semantic segmentation model is trained in the following manner:

dividing a sample video file into video segments based on the preset duration threshold;

extracting a second key frame of each second video segment in a division result; and using the second key frame as sample data, using a category identifier of each pixel in a semantic segmentation map of the second key frame as a label, and inputting them to a to-be-trained semantic segmentation model for training, to obtain the semantic segmentation model, where the semantic segmentation model associates the second key frame with the category identifier of each pixel.

Optionally, the second extraction means 704 includes:

a first division sub-means, configured to divide each audio file in the audio set based on the preset duration threshold;

a second processing sub-means, configured to perform Fourier transform on each first audio segment in a division result, to generate a first spectrum signal of each first audio segment; and a third processing sub-means, configured to input the first spectrum signal into an audio feature extraction model for processing, to generate the audio feature of each audio file in the audio set.

Optionally, the audio feature extraction model is trained in the following manner:

dividing a sample audio file based on the preset duration threshold;

performing Fourier transform on each second audio segment in a division result, to generate a second spectrum signal of each second audio segment; and using the second spectrum signal as sample data, using an audio type of the sample audio file as a label, and inputting them to a to-be-trained audio feature extraction model for training, to obtain the audio feature extraction model, where the audio feature extraction model associates the second spectrum signal with the audio type.

Optionally, the construction means 706 includes:

a generation sub-means, configured to perform dimension scaling processing on the audio feature and the semantic segmentation feature based on a preset feature dimension, to generate a target audio feature and a target semantic segmentation feature; and a first alignment sub-means, configured to align the target audio feature and the target semantic segmentation feature.

Optionally, the construction means 706 includes:

a calculation sub-means, configured to calculate a distance between the audio feature and the semantic segmentation feature; and a construction sub-means, configured to: use an audio file corresponding to an audio feature whose distance from the semantic segmentation feature is less than a preset distance threshold as the target audio file, and construct the background audio based on the target audio file.

Optionally, the construction means 706 includes:

a second alignment sub-means, configured to input the audio feature and the semantic segmentation feature into an audio alignment model for alignment.

Optionally, the audio alignment model is trained in the following manner:

constructing a plurality of triplet training samples including sample video data, positive sample audio data, and negative sample audio data;

inputting the plurality of triplet training samples into the audio alignment model, to obtain feature vectors of sample video data, positive sample audio data, and negative sample audio data in each triplet training sample; and calculating a first distance between the feature vectors of the sample video data and the positive sample audio data and a second distance between the feature vectors of the sample video data and the negative sample audio data in each triplet training sample, inputting the first distance and the second distance into a metric learning loss function, and training the audio alignment model based on an output of the loss function until the loss function tends to be stable.

An example solution of the background audio construction apparatus in this embodiment is described above. It should be noted that the technical solution of the background audio construction apparatus and the technical solution of the background audio construction method belong to a same concept. For details not described in detail in the technical solution of the background audio construction apparatus, refer to the description of the technical solution of the background audio construction method.

Figure 8:
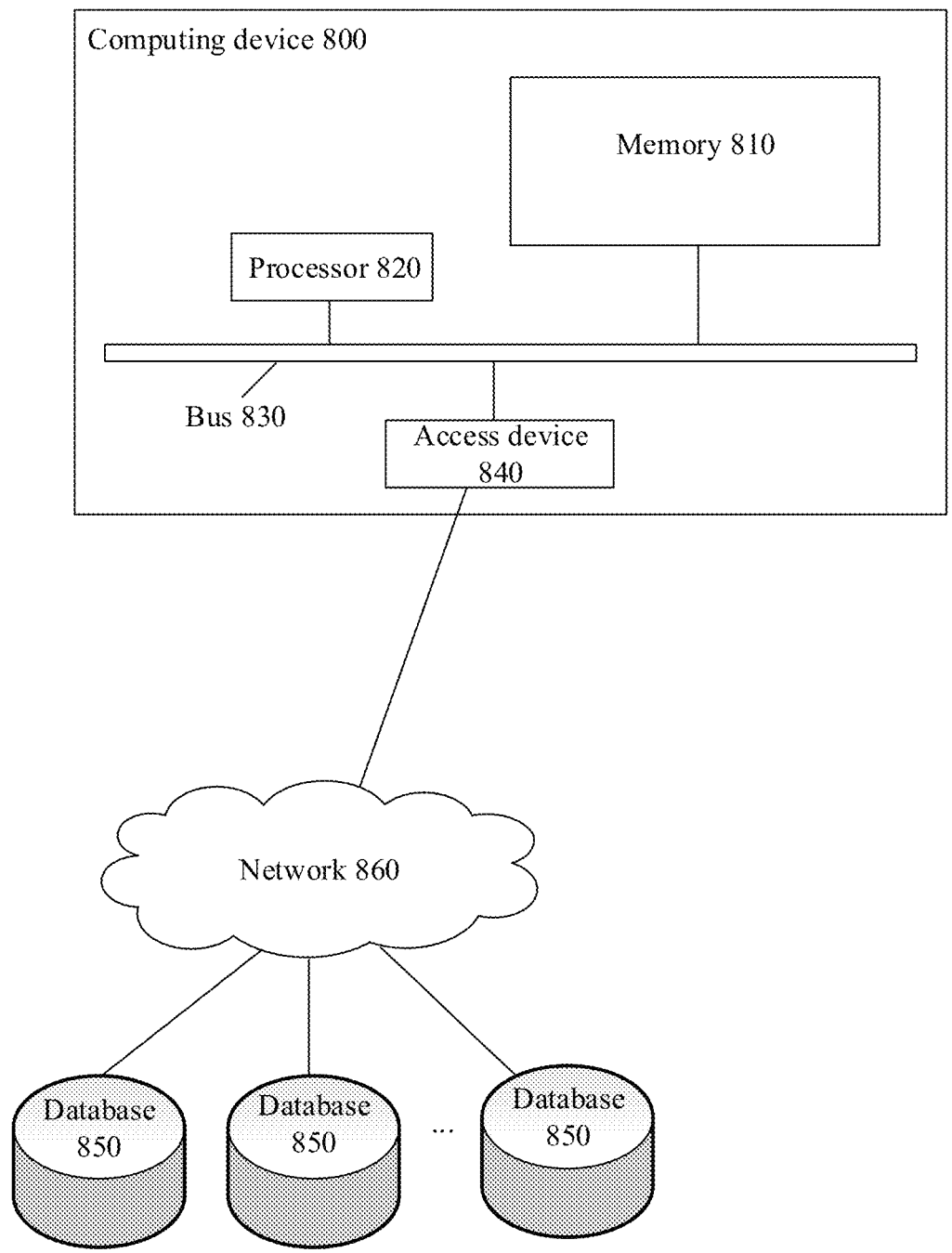
FIG. 8 is a block diagram of a structure of a computing device according to an embodiment of this application.

FIG. 8 is a block diagram of a structure of a computing device 800 according to an embodiment of this application. Components of the computing device 800 include but are not limited to a memory 810 and a processor 820. The processor 820 and the memory 810 are connected by using a bus 830, and a database 850 is configured to store data.

The computing device 800 further includes an access device 840. The access device 840 enables the computing device 800 to communicate through one or more networks 860. Examples of the networks include a public switched telephone network (PSTN), a local area network (LAN), a wide area network (WAN), a personal area network (PAN), or a combination of communication networks such as the Internet. The access device 840 may include one or more of wired or wireless network interfaces (for example, network interface cards (NIC)) of any type, for example, an IEEE802.11 wireless local area network (WLAN) wireless interface, a worldwide interoperability for microwave access (WiMAX) interface, an Ethernet interface, a universal serial bus (USB) port, a cellular network interface, a Bluetooth interface, or a near field communication (NFC) interface.

In an embodiment of this application, the foregoing components of the computing device 800 and other components not shown in FIG. 8 may also be connected to each other, for example, by using the bus. It should be understood that the block diagram of the structure of the computing device shown in FIG. 8 is merely an example, and is not intended to limit the scope of this application. A person skilled in the art may add or substitute other components as required.

The computing device 800 may be any type of static or mobile computing device, including a mobile computer or a mobile computing device (for example, a tablet computer, a personal digital assistant, a laptop computer, a notebook computer, or a netbook), a mobile phone (for example, a smartphone), a wearable computing device (for example, a smart watch or a pair of smart glasses), another type of mobile device, or a static computing device such as a desktop computer or a PC. The computing device 800 may be a mobile or static server.

The processor 820 is configured to execute the following computer-executable instructions. When the processor executes the computer-executable instructions, the step of the background audio construction method is implemented.

An example solution of the computing device in this embodiment is described above. It should be noted that the technical solution of the computing device and the technical solution of the background audio construction method belong to a same concept. For details not described in detail in the technical solution of the computing device, refer to the description of the technical solution of the background audio construction method.

An embodiment of this application further provides a computer-readable storage medium. The computer-readable storage medium stores computer-executable instructions. When the instructions are executed by a processor, the step of the background audio construction method is implemented.

An example solution of the computer-readable storage medium in this embodiment is described above. It should be noted that the technical solution of the storage medium and the technical solution of the background audio construction method belong to a same concept. For details not described in detail in the technical solution of the storage medium, refer to the description of the technical solution of the background audio construction method.

An embodiment of this application further provides a computer program product. When the computer program product is executed in a computer, the computer is enabled to perform the step of the background audio construction method.

An example solution of the computer program product in this embodiment is described above. It should be noted that the technical solution of the computer program product and the technical solution of the background audio construction method belong to a same concept. For details not described in detail in the technical solution of the computer program product, refer to the description of the technical solution of the background audio construction method.

Specific embodiments of this application are described above. Other embodiments fall within the scope of the appended claims. In some cases, the actions or steps described in the claims may be performed in a sequence different from that in the embodiments, and the desired results can still be achieved. In addition, the process described in the accompanying drawings does not necessarily require a particular sequence or sequential sequence shown to achieve the desired results. In some implementations, multi-tasking and parallel processing may be advantageous.

The computer instructions include computer program product code. The computer program product code may be in a source code form, an object code form, an executable file, some intermediate forms, or the like. The computer-readable medium may include any entity or apparatus that can carry the computer program product code, a recording medium, a USB flash drive, a removable hard disk, a magnetic disk, an optical disc, a computer memory, a read-only memory (ROM, Read-Only Memory), a random access memory (RAM, Random Access Memory), an electrical carrier signal, a telecommunications signal, a software distribution medium, and the like. It should be noted that content included in the computer-readable medium may be appropriately increased or decreased in accordance with the requirements of the legislation and patent practice in the jurisdiction. For example, in some jurisdictions, the computer-readable medium does not include the electrical carrier signal or the telecommunications signal in accordance with the legislation and patent practice.

It should be noted that for simplicity of description, the foregoing method embodiments are described as a series of action combinations. However, a person skilled in the art should appreciate that the embodiments of this application is not limited by the described action sequence because some steps may be performed in another sequence or simultaneously performed according to the embodiments of this application. In addition, a person skilled in the art should also appreciate that the embodiments described in the specification are preferred embodiments, and the actions and means involved are not necessarily required by the embodiments of this application.

In the foregoing embodiments, each embodiment is described by focusing on a different aspect. For a part that is not described in detail in an embodiment, refer to the related description in another embodiment.

The preferred embodiments of this application disclosed above are merely intended to help describe this application. The optional embodiments do not describe all details, and the present invention is not limited to the specific implementations. Clearly, many modifications and changes may be made based on the content of the embodiments of this application. These embodiments are selected and described in detail in this application, to better explain the principles and practical application of the embodiments of this application, so that a person skilled in the art can well understand and use this application. This application is only subjected to the claims and the scope and equivalents thereof.

What is claimed is:

1. A method, comprising:
performing semantic segmentation on to-be-processed video data to generate a corresponding semantic segmentation map, and extracting a semantic segmentation feature of the to-be-processed video data based on the semantic segmentation map;
extracting an audio feature of each audio file in a pre-established audio set; and
aligning the audio feature and the semantic segmentation feature, selecting a target audio file from the audio set based on an alignment result, and constructing background audio for the to-be-processed video data based on the target audio file,
wherein the aligning the audio feature and the semantic segmentation feature comprises:
performing dimension scaling processing on the audio feature and the semantic segmentation feature based on a preset feature dimension, to generate a target audio feature and a target semantic segmentation feature; and
aligning the target audio feature and the target semantic segmentation feature.

2. The method according to claim 1, wherein the performing semantic segmentation on to-be-processed video data to generate a corresponding semantic segmentation map comprises:
dividing the to-be-processed video data into video segments based on a preset duration threshold;
extracting a first key frame of each first video segment in a division result; and
inputting the first key frame into a semantic segmentation model for processing, to generate a first semantic segmentation map of each first video segment.

3. The method according to claim 2, wherein the extracting a semantic segmentation feature of the to-be-processed video data based on the semantic segmentation map comprises:
extracting a first semantic segmentation feature of each first video segment based on the first semantic segmentation map; and
calculating an average value of first semantic segmentation features of all the first video segments in the division result, and using the average value as the semantic segmentation feature of the to-be-processed video data.

4. The method according to claim 2, wherein the semantic segmentation model is trained as follows:
dividing a sample video file into video segments based on the preset duration threshold;
extracting a second key frame of each second video segment in a division result; and
using the second key frame as sample data, using a category identifier of each pixel in a semantic segmentation map of the second key frame as a label, and inputting them to a to-be-trained semantic segmentation model for training, to obtain the semantic segmentation model, wherein the semantic segmentation model associates the second key frame with the category identifier of each pixel.

5. The method according to claim 1, wherein the extracting an audio feature of each audio file in a pre-established audio set comprises:
dividing each audio file in the audio set based on the preset duration threshold;
performing Fourier transform on each first audio segment in a division result, to generate a first spectrum signal of each first audio segment; and
inputting the first spectrum signal into an audio feature extraction model for processing, to generate the audio feature of each audio file in the audio set.

6. The method according to claim 5, wherein the audio feature extraction model is trained as follows:
dividing a sample audio file based on the preset duration threshold;
performing Fourier transform on each second audio segment in a division result, to generate a second spectrum signal of each second audio segment; and
using the second spectrum signal as sample data, using an audio type of the sample audio file as a label, and inputting them to a to-be-trained audio feature extraction model for training, to obtain the audio feature extraction model, wherein the audio feature extraction model associates the second spectrum signal with the audio type.

7. The method according to claim 1, wherein the aligning the audio feature and the semantic segmentation feature, selecting a target audio file from the audio set based on an alignment result, and constructing background audio for the to-be-processed video data based on the target audio file comprises:
calculating a distance between the audio feature and the semantic segmentation feature; and
using an audio file corresponding to an audio feature whose distance from the semantic segmentation feature is less than a preset distance threshold as the target audio file, and constructing the background audio based on the target audio file.

8. The method according to claim 1, wherein the aligning the audio feature and the semantic segmentation feature comprises:
inputting the audio feature and the semantic segmentation feature into an audio alignment model for alignment.

9. The method according to claim 8, wherein the audio alignment model is trained as follows:
constructing a plurality of triplet training samples comprising sample video data, positive sample audio data, and negative sample audio data;
inputting the plurality of triplet training samples into the audio alignment model, to obtain feature vectors of sample video data, positive sample audio data, and negative sample audio data in each triplet training sample; and
calculating a first distance between the feature vectors of the sample video data and the positive sample audio data and a second distance between the feature vectors of the sample video data and the negative sample audio data in each triplet training sample, inputting the first distance and the second distance into a metric learning loss function, and training the audio alignment model based on an output of the loss function until the loss function tends to be stable.

10. A computing device, comprising:
a memory and a processor, wherein
the memory is configured to store computer-executable instructions, the processor is configured to execute the computer-executable instructions, when executing the computer-executable instructions, the processor perform operations comprising:
performing semantic segmentation on to-be-processed video data to generate a corresponding semantic segmentation map, and extracting a semantic segmentation feature of the to-be-processed video data based on the semantic segmentation map;
extracting an audio feature of each audio file in a pre-established audio set; and
aligning the audio feature and the semantic segmentation feature, selecting a target audio file from the audio set based on an alignment result, and constructing background audio for the to-be-processed video data based on the target audio file,
wherein the aligning the audio feature and the semantic segmentation feature comprises:
performing dimension scaling processing on the audio feature and the semantic segmentation feature based on a preset feature dimension, to generate a target audio feature and a target semantic segmentation feature; and
aligning the target audio feature and the target semantic segmentation feature.

11. The computing device according to claim 10, wherein the performing semantic segmentation on to-be-processed video data to generate a corresponding semantic segmentation map comprises:
dividing the to-be-processed video data into video segments based on a preset duration threshold;
extracting a first key frame of each first video segment in a division result; and
inputting the first key frame into a semantic segmentation model for processing, to generate a first semantic segmentation map of each first video segment.

12. The computing device according to claim 11, wherein the extracting a semantic segmentation feature of the to-be-processed video data based on the semantic segmentation map comprises:
extracting a first semantic segmentation feature of each first video segment based on the first semantic segmentation map; and
calculating an average value of first semantic segmentation features of all the first video segments in the division result, and using the average value as the semantic segmentation feature of the to-be-processed video data.

13. The computing device according to claim 11, wherein the semantic segmentation model is trained as follows:
dividing a sample video file into video segments based on the preset duration threshold;
extracting a second key frame of each second video segment in a division result; and
using the second key frame as sample data, using a category identifier of each pixel in a semantic segmentation map of the second key frame as a label, and inputting them to a to-be-trained semantic segmentation model for training, to obtain the semantic segmentation model, wherein the semantic segmentation model associates the second key frame with the category identifier of each pixel.

14. The computing device according to claim 10, wherein the extracting an audio feature of each audio file in a pre-established audio set comprises:
dividing each audio file in the audio set based on the preset duration threshold;
performing Fourier transform on each first audio segment in a division result, to generate a first spectrum signal of each first audio segment; and
inputting the first spectrum signal into an audio feature extraction model for processing, to generate the audio feature of each audio file in the audio set.

15. The computing device according to claim 14, wherein the audio feature extraction model is trained as follows:
dividing a sample audio file based on the preset duration threshold;
performing Fourier transform on each second audio segment in a division result, to generate a second spectrum signal of each second audio segment; and
using the second spectrum signal as sample data, using an audio type of the sample audio file as a label, and inputting them to a to-be-trained audio feature extraction model for training, to obtain the audio feature extraction model, wherein the audio feature extraction model associates the second spectrum signal with the audio type.

16. The computing device according to claim 10, wherein the aligning the audio feature and the semantic segmentation feature, selecting a target audio file from the audio set based on an alignment result, and constructing background audio for the to-be-processed video data based on the target audio file comprises:
   calculating a distance between the audio feature and the semantic segmentation feature; and
   using an audio file corresponding to an audio feature whose distance from the semantic segmentation feature is less than a preset distance threshold as the target audio file, and constructing the background audio based on the target audio file.

17. A non-transitory computer-readable storage medium, wherein the non-transitory computer-readable storage medium stores computer-executable instructions, which when executed by a processor, cause the processor to perform operations comprising:
   performing semantic segmentation on to-be-processed video data to generate a corresponding semantic segmentation map, and extracting a semantic segmentation feature of the to-be-processed video data based on the semantic segmentation map;
   extracting an audio feature of each audio file in a pre-established audio set; and
   aligning the audio feature and the semantic segmentation feature, selecting a target audio file from the audio set based on an alignment result, and constructing background audio for the to-be-processed video data based on the target audio file,
   wherein the aligning the audio feature and the semantic segmentation feature comprises:
   performing dimension scaling processing on the audio feature and the semantic segmentation feature based on a preset feature dimension, to generate a target audio feature and a target semantic segmentation feature; and
   aligning the target audio feature and the target semantic segmentation feature.

18. The medium according to claim 17, wherein the performing semantic segmentation on to-be-processed video data to generate a corresponding semantic segmentation map comprises:
   dividing the to-be-processed video data into video segments based on a preset duration threshold;
   extracting a first key frame of each first video segment in a division result; and
   inputting the first key frame into a semantic segmentation model for processing, to generate a first semantic segmentation map of each first video segment.

* * * * *